UNITED STATES PATENT OFFICE.

WILLIAM H. ROSS, ALBERT R. MERZ, AND JOHN N. CAROTHERS, OF WASHINGTON, DISTRICT OF COLUMBIA.

PROCESS FOR PREPARING A CONCENTRATED FERTILIZER.

1,194,077. Specification of Letters Patent. Patented Aug. 8, 1916.

No Drawing. Application filed May 20, 1916. Serial No. 98,795.

(DEDICATED TO THE PUBLIC.)

*To all whom it may concern:*

Be it known that we, WILLIAM H. ROSS, ALBERT R. MERZ, and JOHN N. CAROTHERS, citizens of the United States of America and employees of the Department of Agriculture of the said United States, residing at Washington, District of Columbia, (whose post-office address is Washington, District of Columbia,) have invented a new and useful Process for Preparing a Concentrated Fertilizer.

This application is made under the act of March 3, 1883, chapter 143 (22 Stat., 625), and the invention herein described and claimed may be used by the Government of the United States or any of its officers or employees in the prosecution of work for the Government, or any person in the United States, without payment to us of any royalty thereon.

Our invention relates to a process for preparing a concentrated fertilizer consisting of ammonia and phosphorus oxid in chemical combination, which by reason of its concentrated form will admit of being shipped to places remote from where the product is formed.

A number of processes have already been proposed for preparing a concentrated fertilizer all of which involve the neutralization of phosphoric acid in solution by ammonia to form an ammonium salt of orthophosphoric acid. Thus in the process for the extraction of phosphoric acid from phosphate rock by heat, as in an electric furnace, the fumes of $P_2O_5$ are absorbed by water in a series of scrubbing towers, and the solution of phosphoric acid thus formed is circulated through the towers until a solution is obtained containing about 50 per cent. of phosphoric anhydrid. Ammonia is then passed into the solution, until all the phosphoric acid is changed into the mono-compound, with possibly a portion thereof still further converted to the di-compound. The whole mass then becomes solid in cooling but contains about 20 per cent. of moisture which is subsequently removed by drying.

In carrying out our process, which is applicable in the case of any method for recovering phosphoric acid from phosphate rock through volatilization of the former by heat generated either by use of the electric current or by the combustion of fuel, we allow gaseous ammonia, with or without the addition of steam to come in contact with the evolved phosphorus fumes either in the oxidizing tower or in a suitable chamber succeeding this, where in cooling down the gases react, through the medium of the water vapor already present in the atmosphere, and of that which may have been added, to form a compound, such as ammonium metaphosphate, ammonium pyrophosphate, ammonium orthophosphate or other compound of a phosphorus oxid and ammonia with water. Which particular compound will be formed will depend on conditions, as, the amount of water vapor present, the temperature of the reacting gases, and the like. Certain possible variations in the resultant product dependent upon changes in quantity of water vapor are shown by the following equations:

$$P_2O_5 + H_2O + 2NH_3 = 2NH_4PO_3$$
$$P_2O_5 + 2H_2O + 2NH_3 = (NH_4)2H_2P_2O_7$$
$$P_2O_5 + 3H_2O + 2NH_3 = 2NH_4H_2PO_4$$

It is understood that the ammonia used in this process may be prepared by fixing atmospheric nitrogen or from any other source such as coal. Whether or not it will be necessary to add any water vapor to the reacting gases will be dependent in a large measure on the moisture content already present in the atmosphere and in the raw materials used in the furnace charge.

By our invention a concentrated fertilizer is thus obtained directly in the dry way without the aid of scrubbing towers of any kind, and all expenses involved in the evaporation of solutions, filtration and the drying of crystallized salts, operations which are incident to the preparation of salts by the wet method, are avoided. Furthermore, when the process is carried out so as to produce ammonium meta-phosphate there is obtained a combination of ammonia and phosphoric anhydrid in the most concentrated form possible, which enables the cost of shipment of such material to be reduced to a minimum.

When the process is carried out under suitable conditions the solid product resulting from the reacting gases settles out in a very flocculent condition which enables it to be easily collected by such means as the Cottrell electric precipitator, by filtering the gases with the suspended solids through a porous medium, or by an arrangement of baffle plates.

We wish to emphasize that we do not confine our process to the production of ammonium metaphosphate or to any other definite compound of phosphorus oxid and ammonia for there may be produced in the dry state any one of several compounds or a mixture of different compounds by causing variations in the relative amounts of the reacting gases.

Having thus described our process, we claim:

1. A process for the production of a concentrated fertilizer containing nitrogen and phosphorus which consists in allowing gaseous ammonia, in the presence of water vapor, to react with fumes consisting of oxidized phosphorus, then allowing the reacting gases to cool, and finally collecting the product thus formed, substantially as specified.

2. A process for the production in the dry state of a concentrated fertilizer, containing nitrogen and phosphorus, which consists in allowing gaseous ammonium, in the presence of water vapor, to react with the oxidized phosphorus fumes evolved in the volatilization method of decomposing phosphate rock or other source of phosphorus by heat, then allowing the reacting gases to cool, and collecting in the dry state the solid product thus formed.

3. A process for the production in the dry way of a concentrated fertilizer in the form of ammonium metaphosphate, which consists in allowing gaseous ammonia, in the presence of water vapor, to react with the fumes of phosphoric anhydrid evolved in the volatilization method of decomposing phosphate rock or other source of phosphorus by heat, then allowing the reacting gases to cool, and collecting the solid product thus formed in the dry state.

In testimony whereof, we affix our signatures in the presence of two subscribing witnesses.

WILLIAM H. ROSS.
ALBERT R. MERZ.
JOHN N. CAROTHERS.

Witnesses:
E. C. SLUREY,
C. F. MILLER.